United States Patent
Chiang et al.

(10) Patent No.: US 10,278,206 B2
(45) Date of Patent: Apr. 30, 2019

(54) METHOD FOR SCHEDULING RADIO RESOURCE IN UNLICENSED SPECTRUM AND BASE STATION USING THEREOF

(71) Applicant: Industrial Technology Research Institute, Hsinchu (TW)

(72) Inventors: Chi-Tao Chiang, Taipei (TW); You-En Lin, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/390,706

(22) Filed: Dec. 26, 2016

(65) Prior Publication Data
US 2018/0184446 A1 Jun. 28, 2018

(30) Foreign Application Priority Data
Dec. 23, 2016 (TW) .............................. 105142890 A

(51) Int. Cl.
*H04W 72/00* (2009.01)
*H04W 72/12* (2009.01)
(Continued)

(52) U.S. Cl.
CPC .......... *H04W 72/1289* (2013.01); *H04J 11/00* (2013.01); *H04W 72/1215* (2013.01); *H04W 74/0808* (2013.01)

(58) Field of Classification Search
CPC ..... H04W 72/04; H04W 16/12; H04W 24/00; H04W 28/08
(Continued)

(56) References Cited

U.S. PATENT DOCUMENTS 9,326,157 B1 4/2016 Bhorkar et al.
9,331,828 B2 5/2016 Kim et al.
(Continued)

FOREIGN PATENT DOCUMENTS

CN 105636178 6/2016
TW 201628366 8/2016
(Continued)

OTHER PUBLICATIONS

3GPP, "Feasibility Study on Licensed-Assisted Access to Unlicensed Spectrum", 3GPP, TR 36.889, Jun. 2016, 1~285.
3GPP., "Evolved Universal Terrestrial Radio Access (E-UTRA): Physical layer Procedures", 3GPP, TS 36.213 V13.2.0, Jun. 2016, 1~381.
(Continued)

*Primary Examiner* — Anthony S Addy
*Assistant Examiner* — Matthew W Genack
(74) *Attorney, Agent, or Firm* — JCIPRNET

(57) ABSTRACT

A method for scheduling radio resource in an unlicensed spectrum and a base station using the method is provided. This method includes following steps. Downlink data are obtained, and the first starting time point for a downlink transmission of this downlink data is estimated. A plurality of second starting times are set according to the first starting time point. A plurality of downlink control information (DCIs) for the downlink data are prepared before the earliest second start time point. Each of the DCIs is corresponding to each of the first start time point or the second start time points, and each of the DCIs points to a radio resource block of the downlink data. Clear Channel Assessment (CCA) procedure in the unlicensed spectrum is performed, and the DCIs are disposed in a physical downlink control channel (PDCCH) after the channel process is completed.

18 Claims, 5 Drawing Sheets

(51) Int. Cl.
*H04J 11/00* (2006.01)
*H04W 74/08* (2009.01)

(58) Field of Classification Search
USPC ................. 455/450–451, 452.1–452.2, 453
See application file for complete search history.

(56) References Cited

U.S. PATENT DOCUMENTS

| | | | |
|---|---|---|---|
| 9,392,614 | B2 | 7/2016 | Bhorkar et al. |
| 2005/0063347 | A1* | 3/2005 | Sarkkinen ......... H04W 72/1278 370/338 |
| 2014/0376422 | A1* | 12/2014 | Dai ..................... H04W 72/042 370/280 |
| 2015/0117369 | A1* | 4/2015 | Merlin ............... H04W 72/0446 370/329 |
| 2015/0146585 | A1 | 5/2015 | Rashid et al. |
| 2015/0181566 | A1* | 6/2015 | Stopler ............. H04W 72/0413 370/329 |
| 2015/0351081 | A1* | 12/2015 | Zhu .................... H04J 11/003 370/329 |
| 2016/0036618 | A1* | 2/2016 | Einhaus ............... H04L 1/0003 370/329 |
| 2016/0056935 | A1 | 2/2016 | Damnjanovic et al. |
| 2016/0095114 | A1* | 3/2016 | Kim .................. H04W 74/0816 370/329 |
| 2016/0234841 | A1 | 8/2016 | Pao et al. |
| 2016/0316374 | A1* | 10/2016 | Xu ...................... H04W 4/005 |
| 2016/0374059 | A1* | 12/2016 | Park .................... H04W 16/32 |

FOREIGN PATENT DOCUMENTS

| | | |
|---|---|---|
| WO | 2016074250 | 5/2016 |
| WO | 2016122756 | 8/2016 |
| WO | 2016163657 | 10/2016 |
| WO | 2016163688 | 10/2016 |

OTHER PUBLICATIONS

Tao et al., "Enhanced LBT Algorithm for LTE-LAA in Unlicensed Band", IEEE International Symposium on Personal, Indoor and Mobile Radio Communications (PIMRC), Dec. 2015, 1907~1911.

Qimei Chen et al., "An Opportunistic Unlicensed Spectrum Utilization Method for LTE and WiFi Coexistence System", IEEE Global Communications Conference (GLOBECOM), Dec. 2015, 1-6.

Rui Yin et al., "Adaptive LBT for Licensed Assisted Access LTE Networks", IEEE Global Communications Conference (GLOBECOM), Dec. 2015, 1~6.

Anand M. Baswade et al., "Channel Sensing Based Dynamic Adjustment of Contention Window in LAA-LTE Networks", International Conference on Communication Systems and Networks(COMSENETS), Jan. 2016, 1~2.

Chung K. Kim et al., "Adaptive Listen-Before-Talk (LBT) Scheme for LTE and Wi-Fi Systems Coexisting in Unlicensed Band", IEEE Annual Consumer Communications & Networking Conference (CCNC), Jan. 2016, 1~6.

Rui Yin et al., "LBT based Adaptive Channel Access for LTEU Systems", IEEE Transactions on Wireless Communications (TWC), Jun. 2016, 6585~6597.

Huawei et al., "On the Need of Reservation Signal", 3GPP TSG RAN WG1 Meeting #85, May, 2016, 1~3.

Qualcomm Incorporated et al., "Reservation Signal Design for LAA", 3GPP TSG RAN WG1 #82, Aug. 2015, 1~1.

MediaTek Inc. et al., "LAA reservation signal design", 3GPP TSG RAN WG1 LAA Ad Hoc Meeting, Mar. 2015, 1~4.

Wilus Inc. et al., "Correction on channel access procedure for DL LBT", 3GPP TSG-RAN WG1 Meeting #84, Feb. 2016, 1~3.

"Search Report of Europe Counterpart Application", dated Sep. 27, 2017, p. 1-p. 7, in which the listed references were cited.

"Office Action of Taiwan Counterpart Application," dated Jul. 31, 2017, p. 1-p. 8, in which the listed references were cited.

* cited by examiner

METHOD FOR SCHEDULING RADIO RESOURCE IN UNLICENSED SPECTRUM AND BASE STATION USING THEREOF

CROSS-REFERENCE TO RELATED APPLICATION

This application claims the priority benefit of Taiwan application no. 105142890, filed on Dec. 23, 2016. The entirety of the above-mentioned patent application is hereby incorporated by reference herein and made a part of this specification.

TECHNICAL FIELD

The disclosure relates to a method for scheduling radio resource in the unlicensed spectrum and a base station uses the method.

BACKGROUND

Generally, wireless communication systems operate in a dedicated or licensed radio frequency (RF) spectrum. In other words, base stations and wireless terminals are communicated with one other through the dedicated spectrum (or licensed spectrum) authorized by telecommunications providers. However, due to the increasing demand for bandwidth from mobile data services, the existing bandwidth in the licensed spectrum is gradually becoming inadequate in use. Therefore, the 3rd Generation Partnership Project (3GPP) introduces Licensed-assisted Access (LAA) and Carrier Aggregation (CA) for allowing wireless communication systems to operate in an unlicensed spectrum for data communications, so as to increase communication bandwidth for mobile data service.

As one of the challenges for wireless communication systems operated in the unlicensed spectrum is the coexistence of a base station of the wireless communication system (in short, a base station) and other devices (e.g., Wi-Fi devices or other base stations) operated in the unlicensed spectrum. The base station is allowed to perform a data communication in the unlicensed spectrum only after completing a Clear Channel Assessment (CCA) procedure. Due to the undetermined condition of the unlicensed spectrum, during the data communication with a user equipment in the unlicensed spectrum, in addition to a boundary of a subframe aligned with a communication starting time, the base station is allowed to start the data communication at the boundary of the second Long Term Evolution (LTE) slot in the subframe.

Considering the computing capability of hardware in the base station, the base station needs to pre-schedule each downlink data communication. With the undetermined condition of the unlicensed spectrum, a completion time of the CCA procedure can be extended or shorten according to the state of the unlicensed spectrum. Consequently, when the completion time of the CCA procedure is earlier or later than said estimated time and the base station still performs the data transmission after the completion time of the CCA procedure, the user equipment may be unable to find Downlink Control Information (DCI) for the user equipment prepared by the base station from a search space in a Physical Downlink Control Channel (PDCCH), resulting in the failure of the downlink data communication.

In light of the above, due to the undetermined condition of the unlicensed spectrum, it is difficult for the base station to accurately estimate a waiting time before the downlink data communication. As a result, the downlink data communication starting at the expected time is unusual. Under the premise of the limited computing capability of hardware in the base station, finding a way to schedule downlink radio resource in the unlicensed spectrum for the improvement of the overall spectrum utilization is a challenge in the design and implementation of the base station.

SUMMARY

A method for scheduling radio resource and a related device using the method are provided in the embodiments of disclosure, in which a base station can prepare multiple DCIs in advance for one downlink data communication considering the undetermined condition of the unlicensed spectrum (i.e., under the premise that the starting time of the downlink data communication cannot be accurately estimated). The DCIs are adapted to the subframes when the downlink data communication took place and these subframes are before or after an expected one. Accordingly, when the CCA procedure is completed at one subframe within the range of said multiple subframes, all prepared DCIs can be used in the downlink data communication.

A method for scheduling radio resource in the unlicensed spectrum according to the embodiments of the disclosure is adapted to a base station. The method for scheduling radio resource includes the following steps. Downlink data are obtained and the first starting time point is estimated for a downlink transmission of this downlink data. A plurality of the second starting time points are set according to the first starting time point. A plurality of DCIs are prepared for this downlink data before an earliest of the second starting time points. Each of the DCIs is corresponding to the first starting time point or one of the second starting time points, and each of the DCIs points to a radio resource block carrying the downlink data. Further, a CCA procedure in the unlicensed spectrum is performed. After the completion of CCA procedure, all prepared DCIs are disposed in a PDCCH.

A base station according to the embodiments of disclosure includes a signal transmitter and a controller. The signal transmitter is configured to transmit signals in the unlicensed spectrum and the controller is coupled to the signal transmitter. The controller obtains downlink data, estimates the first starting time point for a downlink transmission of this downlink data, and sets a plurality of second starting time points according to the first starting time point. The controller prepares a plurality of DCIs for this downlink data before the earliest of the second start time points. Each of the DCIs is corresponding to the first starting time point or one of the second starting time points, and each of the DCIs points to a radio resource block carrying the downlink data. The controller performs a CCA procedure in the unlicensed spectrum, and disposes the DCIs in a PDCCH after the CCA procedure is completed.

Based on the above, the method for scheduling radio resource and the related device using the method can estimate the number of DCIs by estimating the completion time of the CCA procedure and simultaneously dispose the DCIs in the PDCCH for transmission after the completion of CCA procedure. In this way, the base station may prepare multiple DCIs in advance for handling the situation that the downlink data transmission cannot be accurately estimated. After the CCA procedure is actually completed, the base station may perform the downlink data transmission with the user equipment. As a result, a time required for the downlink data transmission can be reduced.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
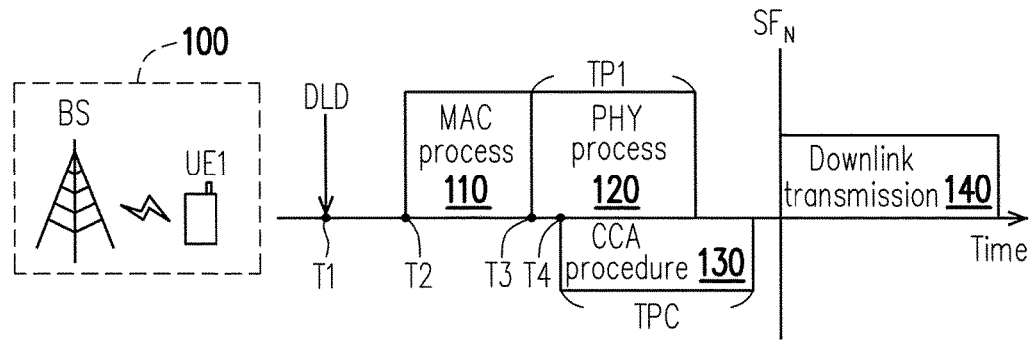
FIG. 1 is a schematic diagram illustrating internal operations of a wireless communication system and a base station in an unlicensed spectrum according to an embodiment of the disclosure.

In the following detailed description, for the purposes of the explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram illustrating internal operations of a wireless communication system 100 and a base station in an unlicensed spectrum according to an embodiment of the disclosure. The wireless communication system 100 of FIG. 1 includes a base station BS and one or more user equipments (herein, a user equipment UE1 is taken as an example). The wireless communication system 100 of the present embodiment refers to related base stations and user equipments compliance with LTE Advance (LTE-A) technology, and the wireless communication system 100 can access the unlicensed spectrum by utilizing Licensed-assisted Access (LAA) technology so that the base station BS is able to transmit downlink data to the user equipment UE1 in the unlicensed spectrum.

The base station BS of the present embodiment can represent various exemplary examples, which may include (but not limited to), for example, Home Evolved NodeB (HeNB), Evolved NodeB (eNB), Advanced Base Station (ABS), Base Transceiver System (BTS), an access point, or a home base station. The user equipment (UE) of the present embodiment can represent various exemplary examples, which may include (but not limited to), for example, a cell phone, a base station, Advanced Mobile Station (AMS), a server, a user terminal, a desktop computer, a notebook computer, a network computer, a workstation, a personal digital assistant (PDA), a tablet computer, a personal computer (PC), a scanner, a phone device, a pager, a camera, a television, a handheld video game device, a music device, a wireless transducer, etc. In certain applications, the user equipment may be a mobile device operable in mobile environments (e.g., a bus, a train, an aircraft, a boat, a vehicle, etc.).

A time line on the right of the FIG. 1 is used to represent the process of a downlink transmission after downlink data (DLD) is obtained by the base station BS, where the downlink data in FIG. 1 is represented by the downlink data DLD. With the reference to the time line on the right of FIG. 1, after the downlink data DLD to be transmitted to the user equipment is obtained by the base station BS at a time point T1, the base station BS performs pre-process on scheduling information related to the downlink data DLD before transmitting the downlink data. After a Clear Channel Assessment (CCA) procedure is completed, the downlink data DLD and the corresponding downlink control information (DCI) can be transmitted in the unlicensed spectrum.

The base station BS starts to process information about the data link layer at a time point T2. In the present embodiment, "processing information about the second layer (data link layer)" is described using a MAC (Media Access Control) process 110 as an example. The MAC process 110 includes related tasks of the data link layer such as assigning downlink Resource Blocks (RBs) according to Quality of Service (QoS), building MAC Protocol Data Units (PDUs) and preparing the DCIs for subframes. Person who applying the present embodiment should understand that the MAC process 110 herein is merely an example and is not limited only by processing information related to the second layer (data link layer) but also resource assignment, scheduling and related calculating time of the base station BS for data.

The base station BS of the present embodiment starts to process information related to the first layer (physical layer) at a time point T3 and simultaneously starts the CCA procedure at a time point T4. In the present embodiment, "processing information related to the first layer (physical layer)" is described using PHY process 120 as an example. The main task of PHY process 120 is to generate the baseband signal for carrying the MAC PDUs. The CCA procedure, used to detect whether a carrier on the unlicensed spectrum is occupied by other devices, is represented by a CCA procedure 130 in the present embodiment. In the present embodiment, the MAC process 110 and the PHY process 120 of the base station BS belong to related processes before the downlink data transmission and are therefore collectively referred to as "pre-process of the base station BS".

The time period of the PHY process 120 (e.g., a time period TP1 as shown in FIG. 1) and an expected processing time of the CCA procedure 130 (e.g., a time period TPC as shown in FIG. 1) can be used to estimate a subframe $SF_N$ when the downlink transmission will occur. In the present embodiment of FIG. 1, because the time period TP1 for performing the PHY process 120 is shorter than the expected processing time period TPC of the CCA procedure 130, the base station BS performs a downlink transmission 140 starting at a boundary of the subframe $SF_N$ after the time period TPC.

In other words, when the CCA procedure 130 is completed, the base station BS performs the downlink transmission 140 at a boundary of a next subframe $SF_N$ or a boundary of a second LTE slot in the subframe $SF_N$, depending on the length of the time period TPC. In other embodiments consistent with the disclosure, if the time period TP1 for performing the PHY process 120 is longer than the processing time period TPC, the base station BS performs the downlink transmission 140 at a boundary of a next encountered subframe $SF_N$ or a boundary of the second LTE slot in the subframe $SF_N$.

Figure 2:
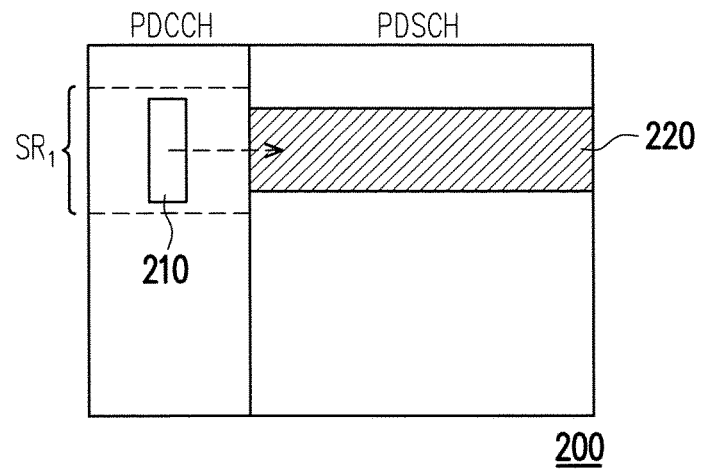
FIG. 2 is a schematic diagram illustrating a downlink data transmission of the base station in the wireless communication system.

FIG. 2 is a schematic diagram illustrating a downlink data transmission of the base station BS in the wireless communication system 100. FIG. 2 illustrates one of subframes 200 transmitted in the unlicensed spectrum. The subframe 200 includes one Physical Downlink Control Channel (PDCCH) and one Physical Downlink Shared Channel (PDSCH). The base station BS transmits one DCI (represented by DCI 210) in the PDCCH, which is configured to inform the user equipment UE1 of related information for receiving the downlink data from the PDSCH. The DCI 210 includes a plurality of control parameters, such as locations of downlink radio resource blocks and which Modulation Coding Scheme (MCS) is to be used for demodulation. After obtaining and interpreting related information of the DCI 210 from a search space in the PDCCH, the user equipment UE1 can then receive the downlink data DLD from a resource block 220 in the PDSCH.

When one user equipment is connecting to the base station BS, the base station BS assigns one Cell Radio Network Temporary Identifier (C-RNTI) to the corresponding mobile device. In general, one or more DCIs are included in the PDCCH, and each DCI is provided to a different one of the user equipments. In other words, one user equipment only corresponds to one DCI. The base station uses the C-RNTI of the corresponding mobile device for scrambling in each DCI, and the search space in the PDCCH varies according to a number of a current subframe and the user equipment UE1 in the meantime. Therefore, the user equipment UE1 first needs to derive the search space in the PDCCH of the current subframe, and—only after finding the DCI of its own from the search space in the PDCCH— uses the C-RNTI owned by the user equipment UE1 to decode content of the DCI. Only by doing so, the user equipment UE1 can then find the corresponding radio resource block in the PDSCH so as to receive the downlink data DLD. The above operation is described using FIG. 2 as an example, in which the user equipment UE1 searches for whether the DCI 210 is present in a search space $SR_1$ and learns the corresponding radio resource block (e.g., the resource block 220) located in the PDSCH by using the DCI with the correct decoding result (e.g., the DCI 210), so as to obtain the downlink data DLD from the radio resource block 220.

To provide a QoS assurance in the unlicensed spectrum, each downlink transmission includes a carrier access priority level, and different carrier access priorities make each transmission information occupying a different number of subframes. In an embodiment, when the carrier access priority level is smaller, the corresponding transmission information is transmitted in higher priority but a maximal number of successively occupiable subframes is less; conversely, when the carrier access priority level is greater, the corresponding transmission information is transmitted relatively later but the maximal number of successively occupiable subframes is greater.

During the MAC process 110 and the PHY process 120, the base station BS needs to learn the number of the subframe $SF_N$ for the downlink transmission 140 before the DCI can be assigned to the appropriate search space. Therefore, if an end time point of the CCA procedure 130 cannot be accurately estimated, it is difficult for the base station BS to prepare the DCIs properly through the MAC process 110 and the PHY process 120.

Considering that the length of the CCA procedure is hard to be accurately held and the base station needs to prepare the DCIs in advance, the embodiments of the disclosure propose to estimate a completion time point of the CCA procedure, derive multiple possible completion time points according to the estimated completion time point, and then prepare multiple DCIs correspondingly by using the possible completion time points. Accordingly, after the CCA procedure is actually completed, as long as a data transmission time of the downlink data is located at any one of the possible completion time points, the base station can then dispose the prepared DCIs in the PDCCH. In this way, the user equipment can obtain the DCI from the search space in the PDCCH to thereby correctly receive the downlink data.

Figure 3:
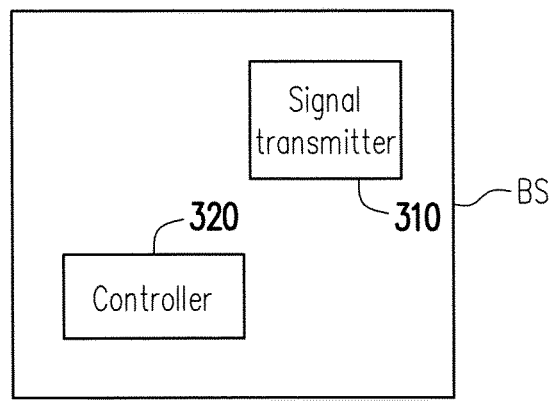
FIG. 3 is a block diagram illustrating a base station according to an embodiment of the disclosure.

FIG. 3 is a block diagram illustrating control of internal modules of a base station BS according to an embodiment of the disclosure. The base station BS includes a signal transmitter 310 and a controller 320. The signal transmitter 310 is configured to transmit signals in the unlicensed spectrum. The signal transmitter 310 can include an antenna, a signal modulator and a signal encoder/decoder, etc. The controller 320 is coupled to the signal transmitter 310, and can be used to implement the method for scheduling radio resource in the unlicensed spectrum illustrated in FIG. 4. The controller 320 can be a main processor of the base station, such as a central processing unit, a microcontroller or an application-specific integrated circuit (ASIC).

Figure 4:
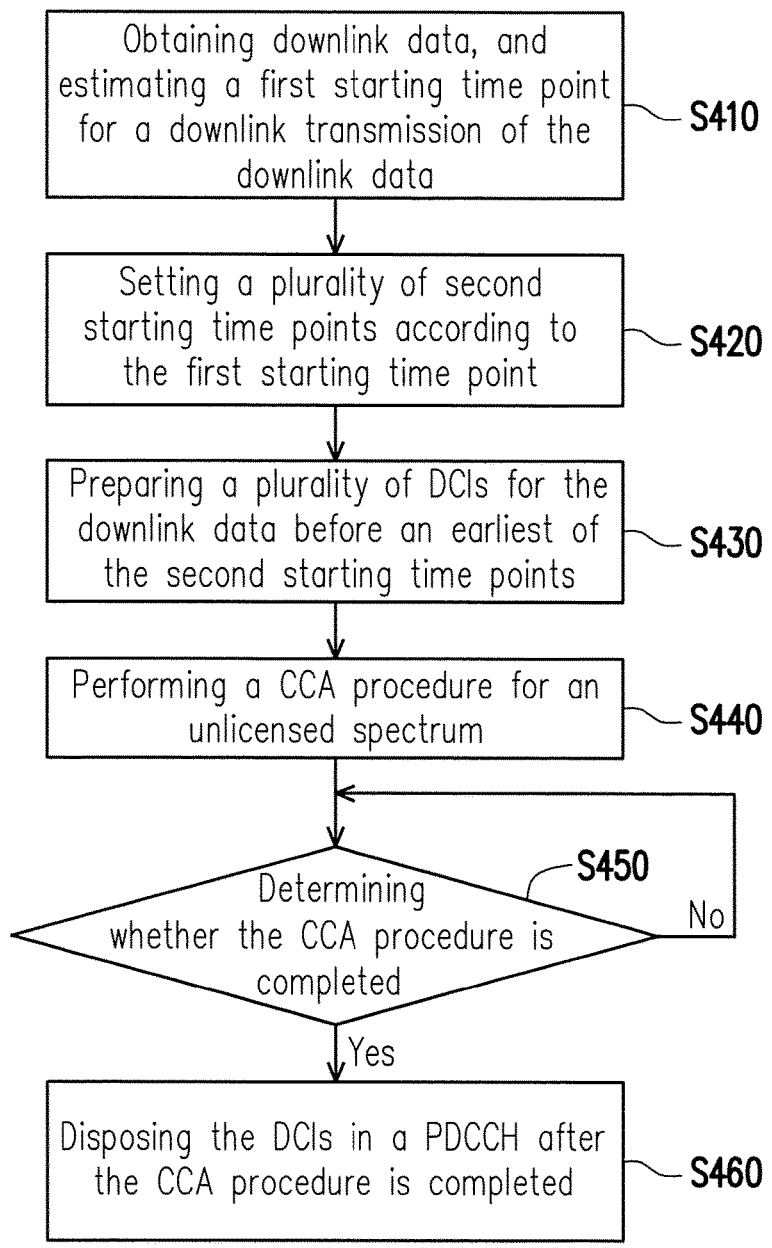
FIG. 4 shows a flowchart illustrating a method for scheduling radio resource according to an embodiment of the disclosure.
Figure 5:
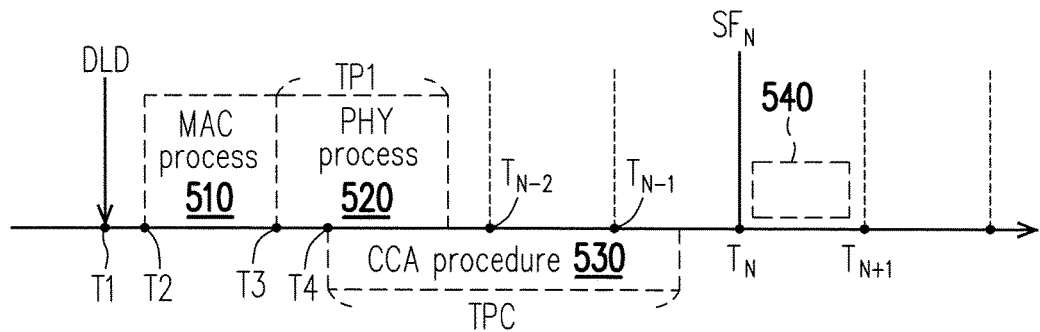
FIG. 5 is a schematic diagram illustrating operation of the base station in the step S410.

FIG. 4 shows a flowchart illustrating a method for scheduling radio resource according to an embodiment of the disclosure. FIG. 5 is a schematic diagram illustrating the operation of the base station in the step S410. The method for scheduling radio resource illustrated in FIG. 4 may be adapted to the base station BS illustrated in FIG. 1 and FIG. 3. Dotted box blocks in FIG. 5 are the estimated processes instead of actually completed processes. Referring to FIG. 4 and FIG. 5 together, in the step S410, the base station BS obtains the downlink data DLD at the time point T1 and estimates a first starting time point (e.g., a time point $T_N$) for a downlink transmission 540 of the downlink data DLD. In FIG. 5, a starting time point $T_N$ for the downlink transmission estimated by the base station BS is illustrated as aligned to a starting boundary of the subframe $SF_N$. In some embodiments, the first starting time point $T_N$ aligned to a boundary of the second LTE slot in the subframe $SF_N$ is also applicable.

The starting time point $T_N$ for the data communication can be estimated through many approaches in the present embodiment. It is given that a time point T3 and a time period TP1 are respectively a processing time point started by physical layer of the base station and a time period required by the PHY process, and the time point T4 and TPC are respectively a start time point of a CCA procedure 530 and an estimated time period required by the CCA procedure 530. Among them, the time point T4 can be initially set the time point T1 (i.e., the CCA procedure is started immediately after the downlink data is obtained by the base station BS) so the base station can determine the first starting time point $T_N$ according to a later one of a completion time point of the CCA procedure 530 and a completion time point of the PHY process. For instance, when the completion time point of the CCA procedure 530 (i.e., the time point passes though TPC from the time point T4) is later than the completion time point of the PHY process (i.e., the time point passes though TP1 from the time point T3), the aforementioned first starting time point $T_N$ is the closet boundary of the secondary slot or subframe $SF_N$, which is greater than or equal to the summation of the starting time of the CCA procedure 530 (i.e., time point T4) and the waiting time period TPC of CCA. Conversely, when the completion time point of the CCA procedure 530 (i.e., the time point passes though TPC from the time point T4) is earlier than the completion time point of the PHY process (i.e., the time point passes though TP1 from the time point T3), the aforementioned first starting time point $T_N$ is the closet boundary of the secondary slot or subframe $SF_N$, which is greater than or equal to the summation of the starting processing time of physical layer (i.e., the time point T3) and the physical layer processing time period TP1. In an embodiment, when the base station BS determines to use the scheduled subframe $SF_N$ or the second LTE slot in the subframe $SF_N$ for the expected downlink transmission 540 to obtain the first start time point $T_N$, the start time point T4 of the CCA procedure 530 can be selectively estimated according to the estimated waiting time period TPC and the first start time point $T_N$. That is to say, the start time point T4 of the CCA procedure 530 can be obtained by deriving the estimated waiting time TPC from the first start time point $T_N$. In the present embodiment, the start time point T4 is a time point going back the time period TPC from the first start time point $T_N$.

Figure 6:
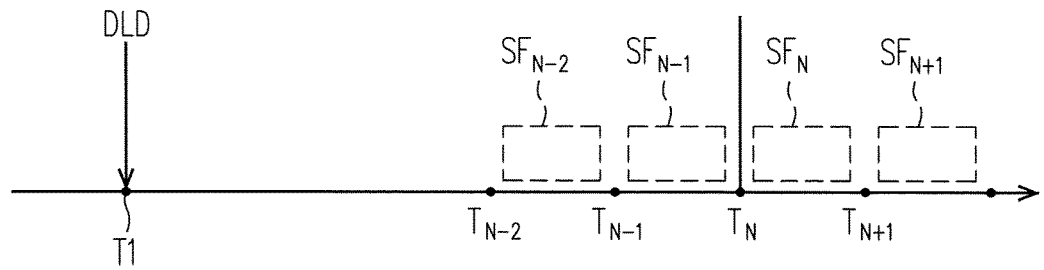
FIG. 6 is a schematic diagram illustrating operation of the base station in the step S420.

FIG. 6 is a schematic diagram illustrating the operation of the base station BS in the step S420. Referring to FIG. 4 and FIG. 6 together, in the step S420, the base station BS sets a plurality of second start time points according to the first start time point $T_N$, such as second start time points $T_{N-2}$, $T_{N-1}$, $T_N$ and $T_{N+1}$. In the present embodiment, the second start time points may at least include the first starting time point $T_N$. In addition to the first starting time point $T_N$, the second starting time points may include one or more time points (e.g., $T_{N-2}$, $T_{N-1}$) obtained by counting one or more subframes earlier than the first start time point $T_N$ and/or one or more time points (e.g., $T_{N+1}$) obtained by counting one or more subframes later than the first start time point $T_N$ in addition to the first start time point $T_N$. In the present embodiment, a quantity of the second start time points is at least two or more than two, and the quantity of the second start time points can be estimated by using an probability or an algorithm. In other words, according to the present embodiment, four time points (the first start time point $T_N$, the time points respectively obtained by counting one and two subframes $T_{N-1}$, $T_{N-2}$ earlier than the first start time point $T_N$, the time point $T_{N+1}$ obtained by counting one subframe later than the first start time point $T_N$) are set as the second starting time points according to a table formed by an empirical law or the probabilistic algorithm. Person who applying the present embodiment may adjust the number of the subframes earlier than or later than the first start time point $T_N$ in order to set the second time points based on actual demands. In some embodiments, the base station can look up said table according to the current situation so as to dynamically adjust the setting and the number of the second start time points.

Figure 7:
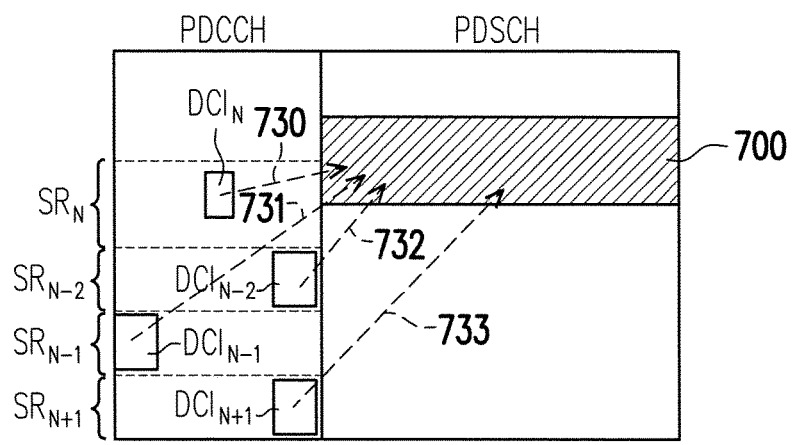
FIG. 7 is a schematic diagram illustrating multiple DCIs included in a subframe in the step S430.

FIG. 7 is a schematic diagram of the radio resource blocks illustrating multiple DCIs mapping to one single PDSCH in the step S430. Referring to FIG. 4 and FIG. 7 together, in the step S430, the base station BS prepares a plurality of DCIs for one downlink data DLD before the earliest second starting time point (e.g., the second starting time point $T_{N-2}$). Each of the DCIs is adapted to the start time points $T_{N-2}$, $T_{N-1}$, $T_N$ and $T_{N+1}$ respectively for transmitting the downlink data, and each of the DCIs points a radio resource block 720 carrying the downlink data DLD (as indicated by dotted arrows 730 to 733 in FIG. 7).

Because each user equipment has a different search space in the PDCCH at a different time point, the user equipment can obtain the desired DCI from the search space more rapidly without searching the entire PDCCH. In the present embodiment, the base station BS disposes each of the prepared $DCI_{N-2}$ to $DCI_{N+1}$ to the search space of the corresponding second start time point so each of the downlink control information $DCI_{N-2}$ to $DCI_{N+1}$ can correspond to respective one of the second start time points $T_{N-2}$, $T_{N-1}$, $T_N$ and $T_{N+1}$. In detail, the base station BS disposes the $DCI_{N-2}$ to a search space $SR_{N-2}$ corresponding to the second start time point $T_{N-2}$; disposes the $DCI_{N-1}$ to a search space $SR_{N-1}$ corresponding to the second start time point $T_{N-1}$; disposes the $DCI_N$ to a search space $SR_N$ corresponding to the second start time point $T_N$; disposes $DCI_{N+1}$ to a search space $SR_{N+1}$ corresponding to the second start time point $T_{N+1}$. FIG. 7 shows multiple $DCI_{N-2}$ to $DCI_{N+1}$ disposed to the corresponding search spaces $SR_{N+2}$ to $SR_{N+1}$ respectively. A PHY process 520 generates one baseband signal according to the DCIs and the downlink data DLD.

In the step S440 of FIG. 4, the base station BS performs the CCA procedure for the unlicensed spectrum. In the step S450, the base station BS continuously determines whether the CCA procedure is completed. If the CCA procedure is not yet completed, the method returns back to step S450 for continuing the determination. If the CCA procedure is completed, the method proceeds to step S460, in which the base station BS simultaneously disposes DCIs (e.g., $DCI_{N-2}$ to $DCI_{N+1}$) prepared in the step S430 in the PDCCH after the CCA procedure is completed.

Figure 8:
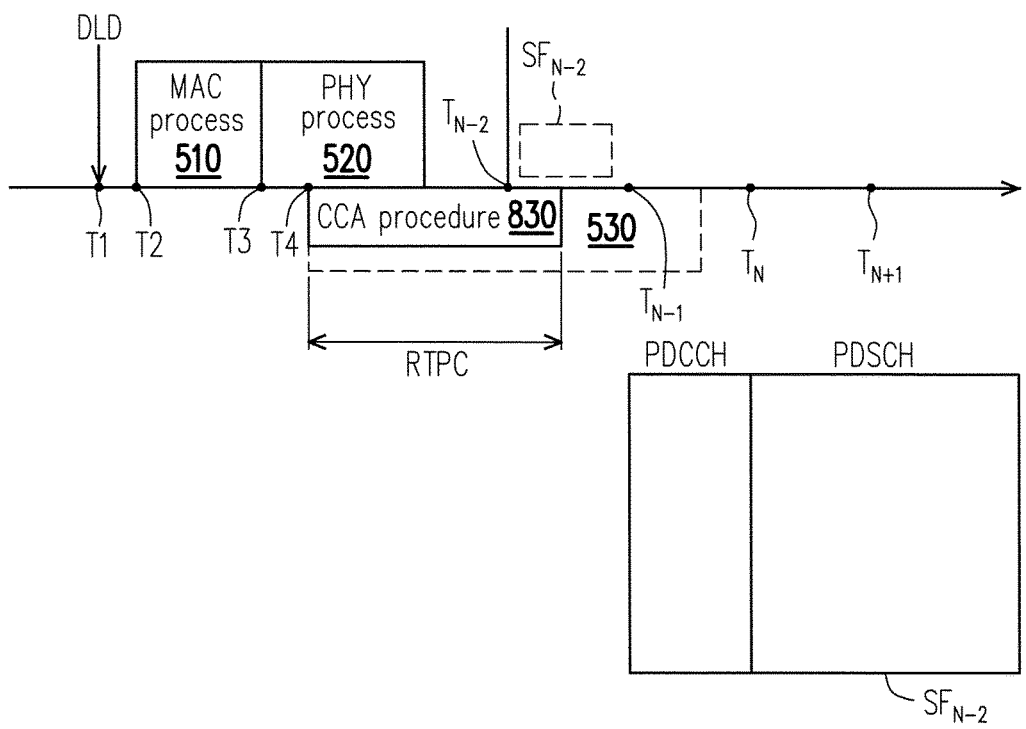
FIG. 8 and FIG. 9 are schematic diagrams illustrating operations of the base station from the step S440 to the step S460.
Figure 9:
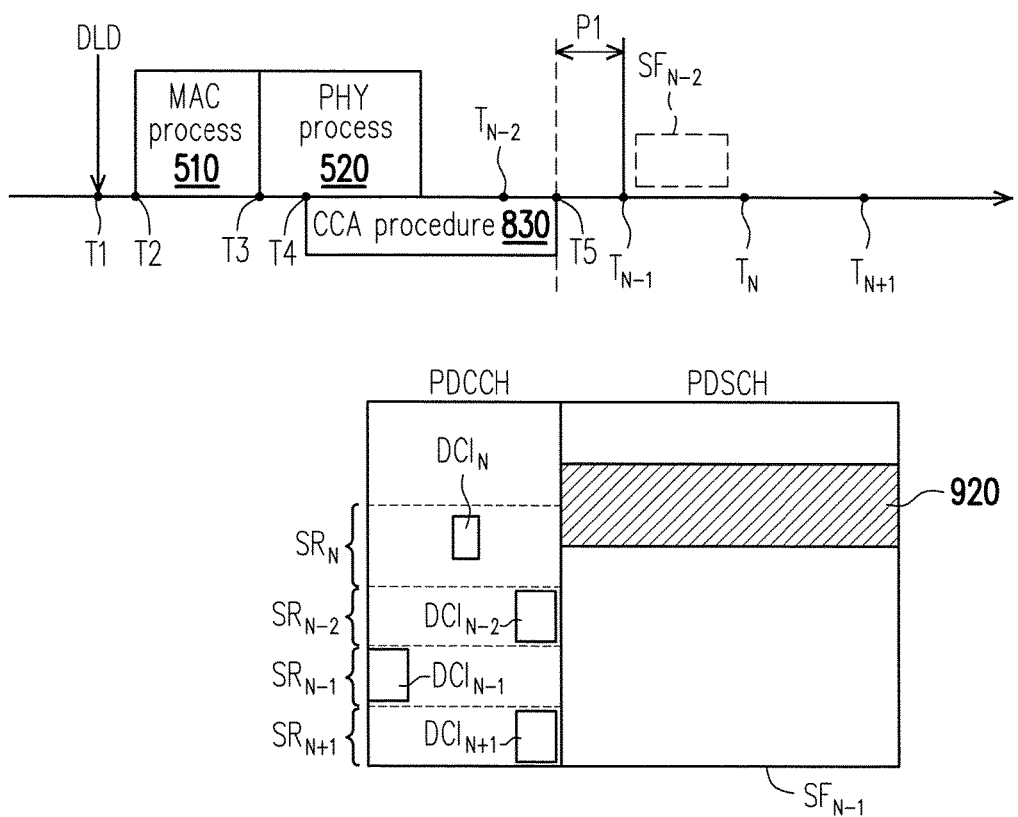

Steps S440 to S460 can be explained with reference to FIG. 8 and FIG. 9. FIG. 8 and FIG. 9 are schematic diagrams illustrating operations of the base station BS in from the step S440 to the step S460. Referring to FIG. 8, the originally estimated CCA procedure 530 is represented by a dotted box block, and a CCA procedure 830 actually performed (represented by a solid box block) is completed between the second start time points $T_{N-2}$ and $T_{N-1}$ and taken a time RTPC. Therefore, at the time point T4, the base station BS performs the CCA procedure 830 for the unlicensed spectrum. At the time point $T_{N-2}$, because the CCA procedure 830 is not yet completed, the base station BS does not dispose any DCI in the PDCCH of the subframe $SF_{N-2}$.

Referring to FIG. 9, at the time point $T_{N-1}$, because the CCA procedure 830 is completed, the base station BS executes step S460 at a boundary of a next subframe $SF_{N-1}$ so as to simultaneously dispose the $DCI_{N-2}$ to $DCI_{N+1}$ prepared in the step S430 in the PDCCH of the unlicensed spectrum. By doing so, the user equipment UE1 can then find the $DCI_{N-1}$ in the search space $SR_{N-1}$ corresponding to the time point $T_{N-1}$ so as to obtain the downlink data DLD from a radio resource block 920 by using the $DCI_{N-1}$. In other words, as long as the CCA procedure 830 is completed between the time point $T_{N-2}$ to the time point $T_{N+1}$, any one of the multiple DCIs prepared in FIG. 7 can be used by the user equipment to obtain information related to the radio resource block 920. In this way, although more resources of the PDCCH are occupied and more calculations are required for preparing the DCIs, it is advantageous in that delay of data transmission of the downlink data DLD would not be increased due to undetermined condition of the unlicensed spectrum and no additional time is required for the MAC process/the PHY process.

In related embodiments consistent with the disclosure, an actual end time point of the CCA procedure is not necessarily to be aligned with the boundary of the subframe or the second LTE slot in the subframe. As shown in FIG. 9, a time P1 refers to the case when an actual end time point T5 of the CCA procedure is earlier than a boundary of a next subframe or the second LTE slot in the next subframe (the time point $T_{N-1}$). In this case, the base station BS according to the embodiments of the disclosure can continuously detect or occupy the unlicensed spectrum to prevent collision from happening due to the unlicensed spectrum occupied by other devices. To do so, one approach is to let the base station BS continuously confirming whether the unlicensed spectrum is cleared between the actual end time point T5 of the CCA procedure and the boundary of the next subframe or the second LTE slot in the next subframe (the time point $T_{N-1}$). Another approach is to let the base station BS transmitting dummy information to occupy the cleared unlicensed spectrum between the actual end time point T5 of the CCA procedure or boundary of the next subframe and the second LTE slot in the next subframe (the time point $T_{N-1}$).

In summary, the method for scheduling radio resource and the related device using the method as provided in the embodiments of the disclosure can prepare multiple DCIs by estimating multiple completion points of the CCA procedure and simultaneously dispose the DCIs in the PDCCH after the CCA procedure is actually completed. Accordingly, even if the time length before downlink data transmission cannot be accurately held, the base station can still prepare the downlink control information in advance and promptly process the downlink transmission of the downlink data, so as to reduce the time required for transmitting the downlink data.

It will be apparent to those skilled in the art that various modifications and variations can be made to the disclosed embodiments. It is intended that the specification and examples be considered as exemplary only, with a true scope of the disclosure being indicated by the following claims and their equivalents

The invention claimed is:

1. A method for scheduling radio resource of an unlicensed spectrum, adapted to a base station, comprising:
   obtaining downlink data related to a user equipment, and estimating a first starting time point for a downlink transmission of the downlink data related to the user equipment;
   setting a plurality of second starting time points according to the first starting time point, wherein the plurality of second starting time points are time points estimated by the base station for estimating a start time of the downlink transmission of the downlink data between the base station and the user equipment;
   preparing a plurality of downlink control information (DCIs) for the downlink data before an earliest of the second starting time points, wherein each of the DCIs is corresponding to the first starting time point or one of the second starting time points, each of the DCIs points to a radio resource block carrying the downlink data, and each of the DCIs are related to the downlink data of the user equipment;
   performing a clear channel assessment (CCA) procedure in the unlicensed spectrum and disposing the DCIs in a physical downlink control channel (PDCCH) after the CCA procedure is completed,
   wherein when an actual end time point of the CCA procedure is earlier than a boundary of a next subframe or a second LTE slot in the next subframe, continuously confirming whether the unlicensed spectrum is cleared between the actual end time point and the boundary of the next subframe or a second LTE slot in the next subframe by an additional CCA procedure.

2. The method for scheduling radio resource of claim 1, wherein each of the DCIs is located in a search space of the corresponding second starting time point in the PDCCH.

3. The method for scheduling radio resource of claim 1, wherein the first starting time point and the second starting time points are all originated from boundaries of subframes or second long term evolution (LTE) slots in the subframes.

4. The method for scheduling radio resource of claim 1, wherein the step of estimating the first starting time point for the downlink transmission of the downlink data comprises:
   estimating an estimated waiting time required by the CCA procedure;
   estimating a physical layer processing time of the base station for preparing the DCIs for the downlink data; and
   determining the first starting time point according to a longer one of the estimated waiting time and the physical layer processing time.

5. The method for scheduling radio resource of claim 1, further comprising:
   when the actual end time point of the CCA procedure is earlier than the boundary of the next subframe or the second LTE slot in the next subframe, transmitting dummy information to occupy a cleared unlicensed spectrum between the actual end time point and the boundary of the next subframe or the second LTE slot in the next subframe.

6. The method for scheduling radio resource of claim 1, further comprising:
   deriving a start time point of the CCA procedure according to the estimated waiting time estimated for the CCA procedure and the first starting time point.

7. The method for scheduling radio resource of claim 1, wherein the second starting time points comprise a time point obtained by counting one or more subframes forward or backward from the first starting time point.

8. The method for scheduling radio resource of claim 1, wherein a quantity of the second starting time points is determined according a probabilistic algorithm or an empirical look-up table.

9. The method for scheduling radio resource of claim 1, further comprising:
   searching and obtaining one of the DCIs from a search space of the PDCCH corresponding to a respective time point by a user equipment, so as to obtain the downlink data from the radio resource block pointed by said one of the DCIs.

10. A base station, comprising:
    a signal transmitter, configured to transmit signals in an unlicensed spectrum; and
    a controller, coupled to the signal transmitter,
    wherein the controller obtains downlink data related to a user equipment, estimates a first starting time point for a downlink transmission of the downlink data related to the user equipment, and sets a plurality of second starting time points according to the first starting time point, wherein the plurality of second starting time points are time points estimated by the base station for estimating a start time of the downlink transmission of the downlink data between the base station and the user equipment,
    the controller prepares a plurality of downlink control information (DCIs) for the downlink data before an earliest of the second starting time points, wherein each of the DCIs is corresponding to the first starting time point or one of the second starting time points, each of the DCIs points to a radio resource block carrying the downlink data, and each of the DCIs are related to the downlink data of the user equipment, the controller performs a clear channel assessment (CCA) procedure in the unlicensed spectrum, and disposes the DCIs in a physical downlink control channel (PDCCH) after the CCA procedure is completed, wherein when an actual end time point of the CCA procedure is earlier than a boundary of a next subframe or a second LTE slot in the next subframe, the controller is required to continuously confirm whether the unlicensed spectrum is cleared between the actual end time point and the boundary the next subframe or the second LTE slot in the next subframe by an additional CCA procedure.

11. The base station of claim 10, wherein each of the DCIs is located in a search space of the corresponding second starting time point in the PDCCH.

12. The base station of claim 10, wherein the first starting time point and the second starting time points are all originated from boundaries of subframes or second LTE slots in the subframes.

13. The base station of claim 10, wherein the controller estimates an estimated waiting time required by the CCA procedure, estimates a physical layer processing time of the base station for preparing the DCIs for the downlink data, and determines the first starting time point according to a longer one of the estimated waiting time and the physical layer processing time.

14. The base station of claim 10, wherein when the actual end time point of the CCA procedure is earlier than the boundary of the next subframe or the second LTE slot in the next subframe, the controller transmits dummy information to occupy a cleared unlicensed spectrum between the actual end time point and the boundary of the next subframe or the second LTE slot in the next subframe.

15. The base station of claim 10, wherein the controller derives a starting time point of the CCA procedure according to the estimated waiting time estimated for the CCA procedure and the first starting time point.

16. The base station of claim 10, wherein the second starting time points comprise a time point obtained by counting one or more subframes forward or backward from the first starting time point.

17. The base station of claim 10, wherein a quantity of the second starting time points is determined according a probabilistic algorithm or an empirical look-up table.

18. The base station of claim 10, wherein a user equipment searches and obtains one of the DCIs from a search space of the PDCCH corresponding to a respective time point, so as to obtain the downlink data from the radio resource block pointed by said one of the DCIs.

* * * * *